United States Patent [19]

Kushmuk

[11] 4,241,801
[45] Dec. 30, 1980

[54] APPARATUS TO MEASURE ELONGATION DUE TO BENDING UNDER LOAD

[75] Inventor: Walter P. Kushmuk, Niles, Ill.

[73] Assignee: Continental Scale Corporation, Bridgeview, Ill.

[21] Appl. No.: 930,710

[22] Filed: Aug. 3, 1978

[51] Int. Cl.³ ............................................ G01G 21/02
[52] U.S. Cl. ................................. 177/211; 73/141 A; 177/DIG. 9; 308/2 R
[58] Field of Search ............. 177/211, DIG. 9; 338/5; 73/141 A; 308/2 R

[56] References Cited

U.S. PATENT DOCUMENTS

| | | | |
|---|---|---|---|
| 3,124,770 | 3/1964 | Ciavatta | 338/5 |
| 3,472,329 | 10/1969 | Smith | 177/211 |
| 3,512,595 | 5/1970 | Laimins | 177/211 X |
| 3,736,998 | 6/1973 | Flinth | 177/187 |
| 3,938,603 | 12/1976 | Shoberg | 177/211 |
| 4,153,125 | 5/1979 | Hutchinson | 177/211 |

Primary Examiner—Joseph W. Hartary
Attorney, Agent, or Firm—Richard L. Johnston

[57] ABSTRACT

In an apparatus comprising strain gauges mounted on a cantilever beam to measure elongation due to bending under load, the invention provides means in combination with said cantilever beam whereby a load can be applied to said beam so that the strain is directly proportional to the effective length of the beam and errors in measurement which have been incurred by other methods employed in applying the load to the beam are avoided.

4 Claims, 16 Drawing Figures

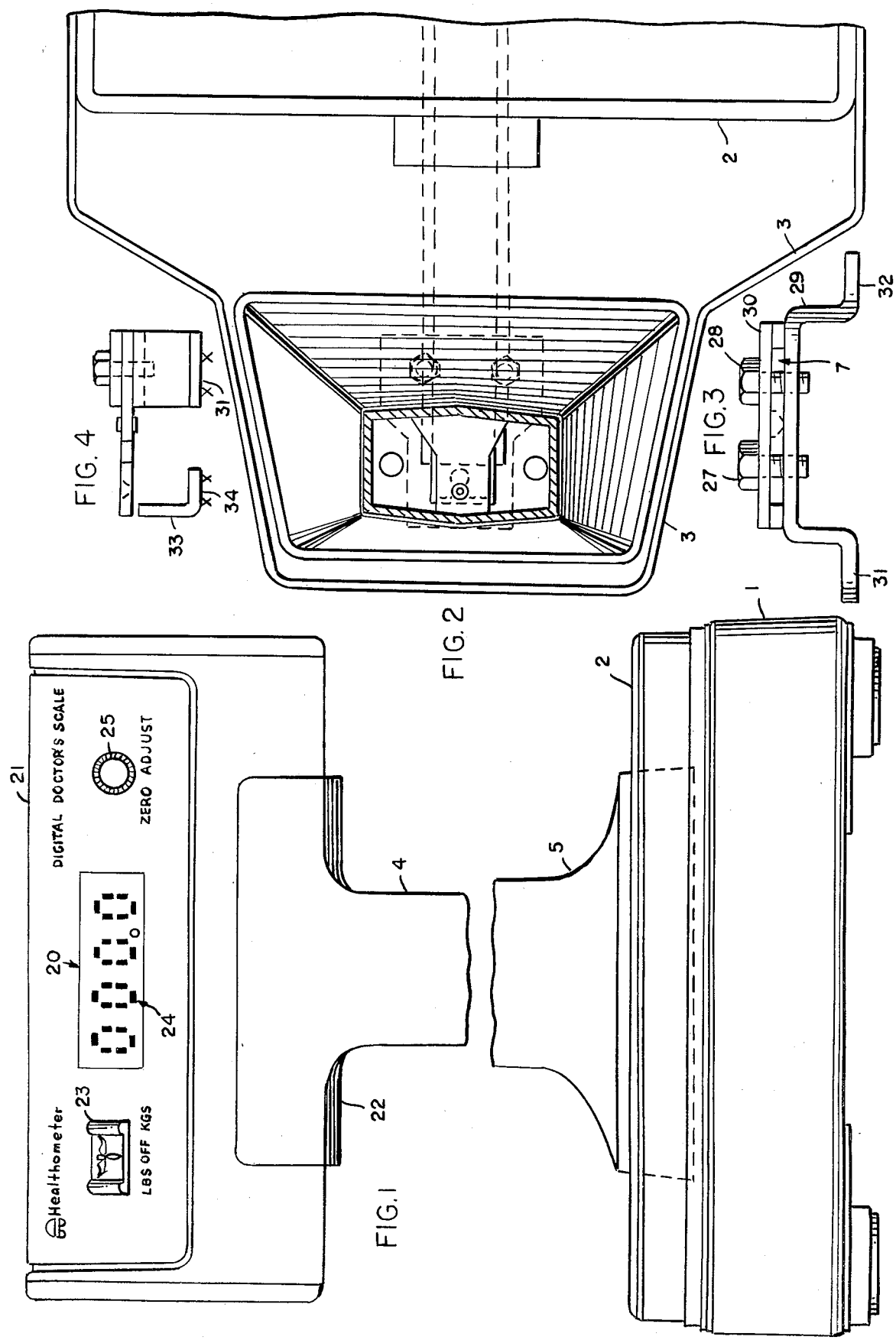

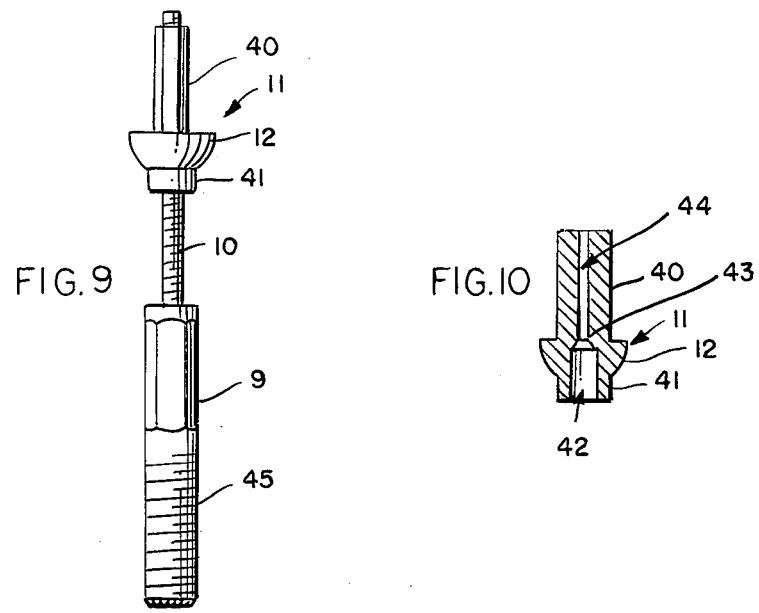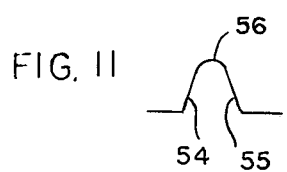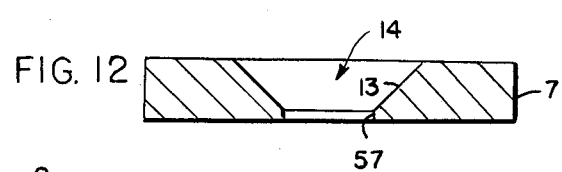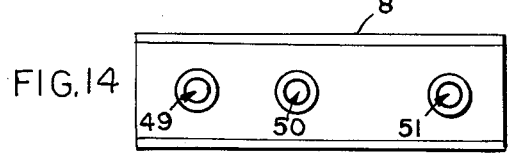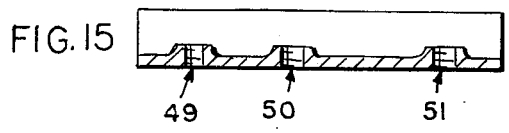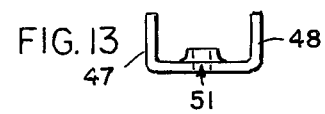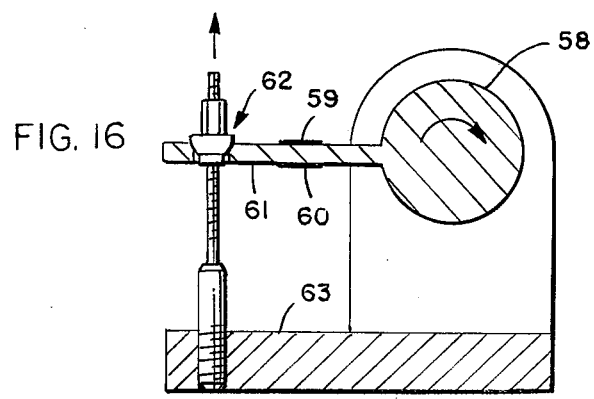

APPARATUS TO MEASURE ELONGATION DUE TO BENDING UNDER LOAD

BACKGROUND

It is known in the art to measure force applied to a beam by means of strain gauges, especially in weighing scales. In some cases the load is applied to the beam by knife edges on the beam cooperating with V-bearings as shown, for example, in U.S. Pat. No. 2,598,812. In other cases with which the present invention is specifically concerned, the load is applied to the beam by forming a frusto-conical hole in the beam and exerting a pulling force against the sides of said hole by a member connected indirectly to the load as illustrated, for example, by the platform-type weighing scale in U.S. patent application Ser. No. 794,058 filed May 5, 1977 now matured into U.S. Pat. No. 4,153,125.

One difficulty with an apparatus of the latter type or any apparatus such as a torque measuring apparatus wherein the load is applied indirectly through the sides of a hole in the cantilever beam resides in the fact that the method used in applying the load in this manner can result in inaccuracy because the strain is directly proportional to the effective length of the beam and any change in length directly affects the strain or elongation. If the method of applying the load, therefore, changes the effective length of the beam, the resultant measurement as, for example, in a weighing scale or torque measuring device, will be inaccurate.

BRIEF SUMMARY OF THE INVENTION

In accordance with the invention, in an apparatus comprising strain gauges mounted on a cantilever beam to measure elongation due to bending under load, the load applying means comprises a spherical or semi-spherical ball mounted in a hole in the load beam adjacent the outer end of said beam with the sides of said spherical or semi-spherical ball engaging the sides of said hole, further characterized by the fact that said spherical or semi-spherical ball has a vertical bore from the bottom thereof to the center of curvature, and a load cable is connected through said bore to the center of said spherical or semi-spherical ball at its center of curvature whereby the effective length of the beam remains substantially constant under load and there is no significant change in length of the beam that directly affects the strain or elongation, regardless of any rotation of the spherical or semi-spherical ball for any given force or load.

The invention also contemplates the addition of a pilot member to the lower part of the spherical or semi-spherical ball so that the rotation of the ball in the hole or socket in the load beam can be limited to the extent that the lower half of the ball will not touch the load cable and the effective length of the beam remains constant under a given load.

DETAILED DESCRIPTION OF THE INVENTION

The invention will be further illustrated but is not limited by the following description in conjunction with the accompanying drawings in which:

FIG. 1 represents a front elevational view, with parts broken away, of a weighing scale illustrating one of the embodiments of the invention;

FIG. 2 is a plan view of the embodiment shown in FIG. 1 with the upper portion removed;

FIG. 3 is a detailed view of one portion of the apparatus illustrated in FIGS. 1 and 2 showing the structure of the supporting means for the load beam;

Figure 5:
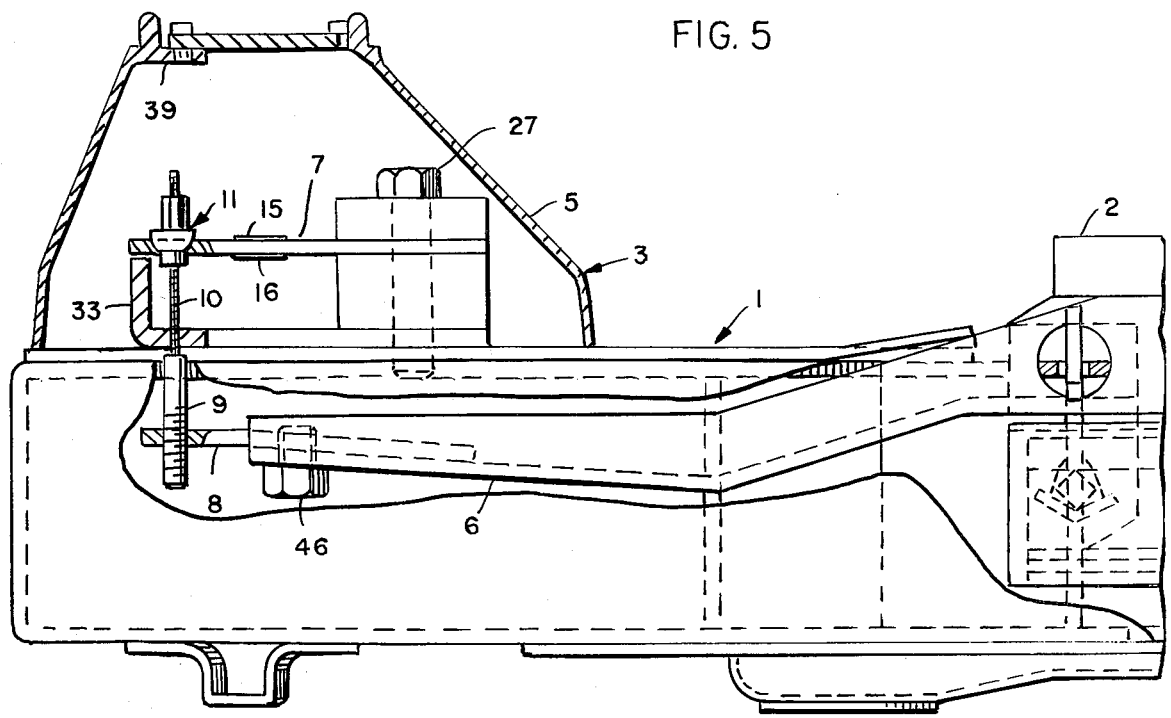
Figure 6:
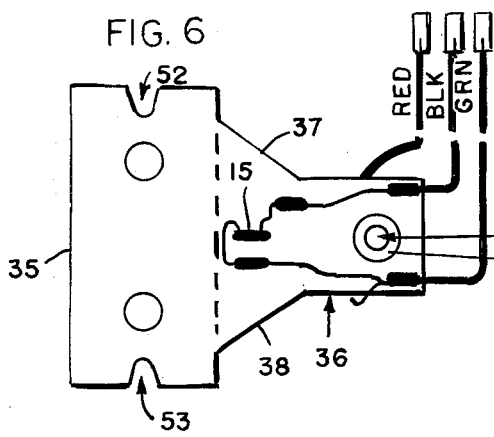
Figure 7:
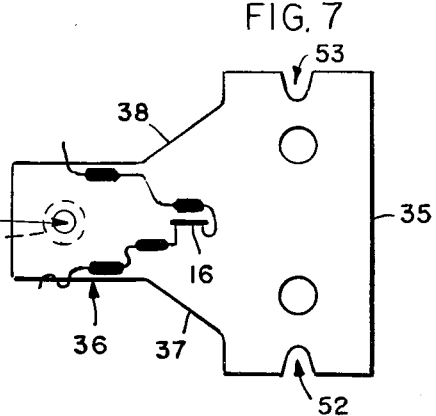
Figure 8:
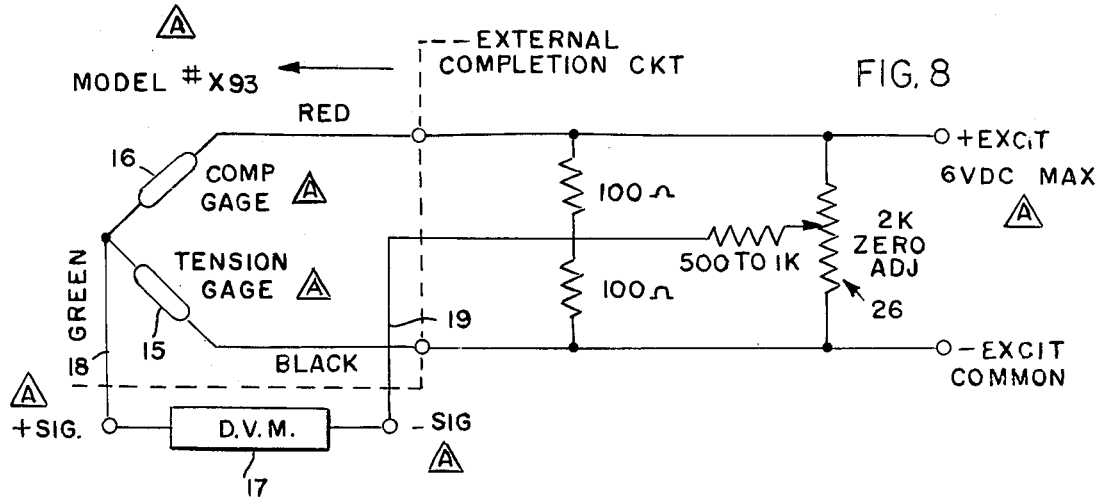

FIG. 4 corresponds to the view shown in FIG. 3 rotated through an angle of 90°;

FIG. 5 is a side view, with parts broken away, of the embodiment shown in FIGS. 1 and 2;

FIG. 6 is a top plan view of the load beam showing strain gauges connected by electrical connections, with parts broken away, to a digital readout mechanism of the type illustrated in the top part of FIG. 1;

FIG. 7 is a bottom plan view of the load beam shown in FIG. 6;

FIG. 8 is a wiring diagram illustrating the electrical circuitry connecting the strain gauges and the digital readout meter to a source of electrical energy;

FIG. 9 is an elevational view of the cable assembly used to connect a load from a long arm lever of a platform weighing scale to a cantilever load beam as shown in FIG. 5;

FIG. 10 is a sectional view vertically through a connecting member having a semi-spherical portion and a bore to receive the load with the lower part of the bore enlarged from the center of curvature of the semi-spherical member to the bottom of the pilot portion of said member;

FIG. 11 is a profile showing in detail the notch portion of the cantilever load beam illustrated in FIGS. 6 and 7;

FIG. 12 is a sectional view of the hole in the cantilever load beam of FIGS. 6 and 7 to the sides of which load is applied through the semi-circular portion of the structures shown in FIGS. 9 and 10;

FIG. 13 is an end view in detail of the nose iron connecting the long arm member of the weighing scale shown in FIG. 5 to the cable structure shown in FIG. 9;

FIG. 14 is a top plan view of the nose iron shown in FIG. 13;

FIG. 15 is a sectional view taken through the midsection lengthwise of the nose iron shown in FIG. 14; and FIG. 16 is another illustration of the manner in which the invention can be applied in other types of torque measurement.

Referring to FIGS. 1, 2 and 5 the platform-type weighing scale illustrated comprises:

(a) a horizontally disposed base 1 having a vertically moveable weighing platform 2 mounted thereon, said base having an extension 3 as illustrated in FIG. 2 extending beyond said weighing platform;

(b) a vertically disposed column 4 mounted on said extension of said base 1, said column having a hollow base portion 5;

(c) weighing mechanism of a conventional type, not shown, mounted on said base operatively with said platform 2, said weighing mechanism including a lever 6 which moves in response to actuation of said weighing mechanism by a load placed on said platform 2, said lever 6 extending from said weighing mechanism to an area below said column as illustrated in FIG. 5;

(d) a load beam 7 mounted in the hollow portion 5 of said column 4;

(e) connecting means comprising a nose iron 8 connecting said lever 6 to a load connecting member 9, the member 9 having an internal bore connected to bond cable 10 which in turn is attached to fitting 11. Fitting 11 has a semi-spherical portion 12 (see FIG. 9), the sides of which engage the inner surfaces 13 (see FIG. 12) of a conical opening 14 in load beam 7 so as to transmit a load from said lever 6 to cause said load beam to move a fraction of an inch in response to a load placed on platform 2;

(f) an upper strain gauge 15 and a lower strain gauge 16 mounted on opposite sides of said load beam and preferably consisting of a wire of germanium or other semi-conducting material which are secured to the upper and lower surfaces, respectively, of load beam 7 by means of a resinous coating or in any other suitable manner;

(g) a digital voltmeter 17 as diagrammatically illustrated in FIG. 8;

(h) wires 18 and 19 connecting the electrical output from strain gauges 15 and 16 to said digital voltmeter 17, and (i) a read-out meter 20 mounted in a housing 21 supported by a yoke 22 as illustrated in FIG. 1, said read-out meter being operatively associated with said digital voltmeter 17 to show measurements in units of weight.

The digital voltmeter 17 is disposed in a replaceable module which contains a slide switch operable from slide knob 23 and movable from an off-position to a lefthand position to close a circuit in order to show weight by a L.E.D. signal in pounds at the display area 24 and movable to a righthand position to close a circuit to show weight in kilograms in the display area 24. An adjusting knob 25 is rotatable to adjust zero potential through a zero potential adjuster 26 (FIG. 8). The necessary circuitry is all mounted on a circuit board, not shown. The structure of the read-out mechanism does not constitute a part of the invention.

Referring to FIGS. 2-5, it will be seen that the load beam 7 is clamped by means of bolts 27 and 28 between a load beam support 29 and a load beam clamp 30. The load beam support 29 is welded to the base 1 at 31 and 32. The stop member 33 is also welded to the base 1 at 34. The load beam 7 as shown is flat with upper and lower sides and has a transverse portion 35 which is generally rectangular and is clamped between members 29 and 30. The outer end 36 is free. The sides of load beam 7 are tapered at 37 and 38 in an intermediate area between the clamped end and the free end and the strain gauges 15 and 16 are disposed centrally in the tapered area whereby stress applied adjacent the free outer end from the lever 6 through the nose iron 8, the member 9, cable 10 and semi-spherical member 11 is substantially uniform throughout the load beam.

In the embodiment shown, the column 4 rests on the top 39 of the hollow base portion 5 and is secured to the base 1 by means of a spade screw, not shown, which is welded to the side of column 4 and fastened to base 1 in any suitable manner. The structure of the column 4 and the hollow base portion 5 and the manner in which they are secured to one another does not constitute a part of the invention.

The strain gauges 15 and 16 which are bonded to the surfaces of the load beam 7 one on top to sense the tensile strain (elongation) and one on the bottom to sense the compressive strain (compression) of the beam's outer surfaces as it bends under the load are employed in half bridge circuits as shown in FIG. 8 to electronically sense the change in resistance in the strain gauge caused by the change in length and cross sectional area as the load beam is bent. Semi-conductor strain gauges are preferably used because of their high sensitivity compared to conventional metallic gauges.

An electronic unit comprising a circuit board, not shown, supplies the excitation current for the strain gauges and contains the necessary circuitry to convert the proportional analogue signal to digital values and display the digital values on a digital readout It also provides means of converting readings to kilograms or pounds, means for calibrating a scale electronically and adjusting for zero or tare electronically by means of potentiometers.

The load beam 7 is preferably made of stainless steel and the total deflection for weighing up to 400 pounds on the platform 2 is preferably a maximum of 0.01" (10 mils). As previously indicated, the taper 37,38 in the load beam assists in providing load beam stress throughout. Germanium strain gauges are preferably 5 mils thick by 30 mils long and have resistance values of 120 ohms or 350 ohms. Gold leads are spot welded to the strain gauges and the strain gauges are bonded by suitable resins to the load beam.

The lever reduction from the weighing mechanism in the base 1 is 10:1 for a 400 pound maximum weight and the unit operates on 6 volts direct current. Thus, for counts or gradients of 0.1 pound the current variation is 20 microvolts per count and the load beam moves 1/10 of a millionth of an inch per count.

The wiring diagram in FIG. 8 is believed to be self-explanatory. Current from a source of electricity such as a 6 volt D.C. battery or a rectifier connected to an alternating current 120 volt outlet passes through two half wheatstone bridge circuits to strain gauges 15 and 16 and thence through output line 18 to digital voltmeter 17 in the digital read-out unit where a signal is recorded and displayed. The zero potential is adjusted at 26 by means of knob 25 in a conventional manner through the circuitry in the read-out unit. The units of weight can be displayed either in pounds or kilograms by moving the slide switch knob 23 to the left or right.

The critical part of the invention resides in the structure of the load applying means adjacent the outer end of the load beam shown in FIG. 9 which consists of a fitting 11 having a semi-spherical portion 12 and upwardly extending shank 40 and a downwardly extending shank 41. The upwardly extending shank 40 is secured to cable 10 and the downwardly extending shank 41 acts as a pilot to limit the rotation of the fitting. As shown by the cross sectional view in FIG. 10 the fitting 11 has a bore 42 which extends inwardly from the bottom of the fitting to the geometric center 43 of the semi-spherical portion 12. Cable 10 is secured by a press fit in bore 44 and extends downwardly through bore 42. For all practical purposes, however, it is fixed and can only move from the geometric center 43. If the cable 10 were fastened, for example, to the outer surface of a ball or sphere the rotation of the ball or sphere could change the effective length of the load arm by an amount such that the strain measured at the strain gauge axis would be changed due to the slight change in effective lengths thereby indicating a different weight although the amount of force applied remains the same. On the other hand, by attaching the cable to the geometrical center of the spherical radius of the semi-spherical member 12 (or to the geometrical center of a ball or sphere), the rotation of the semi-spherical member (or ball or sphere) does not change the effective length of the load beam within narrow limits so long as the cable does not touch the sides of the bore 42. Furthermore, by adding the pilot portion 41 to the semi-spherical portion 12 the rotation of the semi-spherical portion (or a ball or sphere) in its socket, i.e., the conical surface 13, can be limited to the extent that the lower half of the ball will not touch the cable and the effective length of the load beam remains constant. The lower end of cable 10 is secured to the nose iron 8 in any suitable manner, for example, by connecting member 9 which has a threaded portion 45 engaging an internally threaded hole in nose iron 8 whereby any load applied to the weighing platform 2 is transmitted through a conventional lever system including long lever 6 fastened to nose iron 8 by means of screw 46. A downward pull on nose iron 8 causes a downward pull on connecting member 9, cable 10 and semi-spherical portion 12 which in turn displaces load beam 7 a fraction of an inch and the average strain thereby produced is measured by strain gauges 15 and 16 through the electronic system described with respect to FIG. 8. This flexible connecting assembly between the load beam 7 and the nose iron 8 insures an accurate measurement.

In the best mode contemplated for the practice of the invention, the bore 42 is approximately 3/32" in diameter and the semi-spherical portion 12 has a diameter at its geometric center of approximately 9/32". The distance from the top of the semi-spherical portion 12 to the bottom of the pilot portion 40 is approximately 3/16".

The nose iron 8 preferably has a structure as shown in FIGS. 13, 14 and 15 with parallel sides 47 and 48 and bottom openings 49, 50 and 51 which are adapted to receive means for fastening the cable assembly and the long arm lever to the nose iron.

The load beam 7 is preferably notched at 52 and 53 (see FIGS. 6 and 7) with the sides of the notches 54 and 55 15° on either side of the center line and the inner curvature 56 on a radius of approximately 0.063". The sides 13 of hole 14 preferably make an angle of approximately 82°. The vertical distance 57 in opening 14 is approximately 1/64".

FIG. 16 illustrates another application of the invention wherein torque applied through member 58 is measured by strain gauges 59 and 60 of cantilever load beam 61 connected through a cable assembly 62 corresponding to that described with respect to FIGS. 9 and 10 to a base 63. The strain as measured by the strain gauges when connected to an electronic read-out mechanism of the type previously described will give the torque measurements in any predetermined units.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In an apparatus comprising strain gauges mounted on a cantilever load beam to measure elongation due to bending under load, the combination of, means for supporting said beam at one end, the other end being free, means adjacent the free end of said beam comprising a hole in said beam, a fitting having a semi-spherical portion mounted in said hole with its sides engaging the sides of said hole, a vertical bore in said fitting to the geometric center of curvature, a load cable in said bore connected to said fitting which exits at the geometric center of curvature of said semi-spherical portion of said fitting, and means connected to the other end of said cable for applying a load to said load beam whereby the strain is directly proportional to the effective length of the load beam.

2. An apparatus as claimed in claim 1 in which said fitting has an outwardly extending pilot which limits the rotation of said fitting so that the lower part of said semi-spherical portion of said fitting will not touch said cable.

3. An apparatus as claimed in claim 1 in which said cantilever beam is a cantilever beam responsive to weight in a weighing scale.

4. An apparatus as claimed in claim 1 in which said cantilever beam is a cantilever beam responsive to torque in a torque measuring device.

* * * * *